(12) United States Patent
Furuichi et al.

(10) Patent No.: US 11,200,286 B1
(45) Date of Patent: Dec. 14, 2021

(54) GEOSPATIAL DATA ACQUISITION BASED ON INFORMATION VALUE

(71) Applicant: International Business Machines Corporation, Armonk, NY (US)

(72) Inventors: Sanehiro Furuichi, Tokyo (JP); Shoichiro Watanabe, Tokyo (JP); Kenichi Takasaki, Tokyo (JP); Yasutaka Nishimura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 16/878,660

(22) Filed: May 20, 2020

(51) Int. Cl.
*G06F 16/00* (2019.01)
*G06F 16/909* (2019.01)
*G06F 9/54* (2006.01)
*G06F 16/9035* (2019.01)

(52) U.S. Cl.
CPC ............ *G06F 16/909* (2019.01); *G06F 9/541* (2013.01); *G06F 16/9035* (2019.01)

(58) Field of Classification Search
CPC .................................................. G06F 16/909
See application file for complete search history.

(56) References Cited

U.S. PATENT DOCUMENTS

| | | | |
|---|---|---|---|
| 2005/0129277 A1* | 6/2005 | Porter .................. | G06K 9/3241 382/103 |
| 2014/0077969 A1* | 3/2014 | Vian ...................... | G08C 17/02 340/870.02 |
| 2019/0098055 A1 | 3/2019 | Pitre et al. | |
| 2019/0196890 A1 | 6/2019 | Bucchi et al. | |
| 2019/0295113 A1 | 9/2019 | Bharti et al. | |
| 2020/0004589 A1 | 1/2020 | Geiger et al. | |

OTHER PUBLICATIONS

Furuichi et al., "Providing Navigation Services Using Context-Aware Trajectory Analysis", U.S. Appl. No. 16/386,680, filed Apr. 17, 2019.
Bellur et al., "Cost Optimization in Multi-site Multi-cloud Environments with Multiple Pricing Schemes", Article, Dec. 2014, 9 pages.
Ardagna et al., "Context-aware Data Quality Assessment for Big Data", Future Generation Computer Systems, Jul. 23, 2018, 30 pages.
Mell et al., "The NIST Definition of Cloud Computing", Recommendations of the National Institute of Standards and Technology, Sep. 2011, 7 pages.

* cited by examiner

*Primary Examiner* — Ajith Jacob
(74) *Attorney, Agent, or Firm* — Stosch Sabo (57) ABSTRACT

Described are techniques for acquiring geospatial data according to an information value. The techniques including determining a context for geospatial data to be used in an application, where the context is based on one or more external factors that influence variation of the geospatial data. The techniques further include calculating an information value of the geospatial data in the context for each of a plurality of information acquisition methods, where the plurality of information acquisition methods include respective data acquisition frequencies and respective spatial resolutions, and where the information value is based on an information loss function, an information amount, and a cost. The techniques further include selecting a first information acquisition method with a highest information value and acquiring the geospatial data using the first information acquisition method.

20 Claims, 8 Drawing Sheets

| | INFORMATION ACQUISITION METHOD "E" |
|---|---|
| $E_0$ | HIGH FREQUENCY, HIGH RESOLUTION |
| $E_1$ | INTERMEDIATE FREQUENCY, INTERMEDIATE RESOLUTION |
| $E_2$ | LOW FREQUENCY, LOW RESOLUTION |

302

| | | $E_0$ | $E_1$ | $E_2$ |
|---|---|---|---|---|
| $X_0$ | STABLE BAROMETRIC PRESSURE DISTRIBUTION | 0.05 | 0.10 | 0.15 |
| $X_1$ | UNSTABLE BAROMETRIC PRESSURE DISTRIBUTION | 0.85 | 0.90 | 0.95 |

304

| INFORMATION LOSS FUNCTION L(X,E) | | | |
|---|---|---|---|
| | $E_0$ | $E_1$ | $E_2$ |
| $X_0$ | 1.00 | 0.95 | 0.90 |
| $X_1$ | 1.00 | 0.30 | 0.10 |

306

| COST FUNCTION C(X,E) | | | |
|---|---|---|---|
| | $E_0$ | $E_1$ | $E_2$ |
| $X_0$ | 1.00 | 0.50 | 0.20 |
| $X_1$ | 1.00 | 0.50 | 0.20 |

308

| INFORMATION AMOUNT I(X,E) | | | |
|---|---|---|---|
| | $E_0$ | $E_1$ | $E_2$ |
| $X_0$ | 0.07 | 0.15 | 0.23 |
| $X_1$ | 2.73 | 3.32 | 4.32 |

310

| INFORMATION VALUE V(X,E) | | | |
|---|---|---|---|
| | $E_0$ | $E_1$ | $E_2$ |
| $X_0$ | 0.07 | 0.26 | 1.04 |
| $X_1$ | 2.73 | 1.99 | 2.16 |

| | INFORMATION ACQUISITION METHOD "E" |
|---|---|
| $E_0$ | HIGH FREQUENCY |
| $E_1$ | LOW FREQUENCY |
| $E_2$ | LOW FREQUENCY WITH OWN PREDICTION DATA |

402 —

| | | $E_0$ | $E_1$ | $E_2$ |
|---|---|---|---|---|
| $X_0$ | NORMAL STATE | 0.05 | 0.10 | 0.10 |
| $X_1$ | ACCIDENT STATE | 0.80 | 0.90 | 0.90 |
| $X_2$ | CONGESTION STATE IN MORNING/EVENING | 0.80 | 0.90 | 0.90 |

404 —

| INFORMATION LOSS FUNCTION L(X,E) | | | |
|---|---|---|---|
| | $E_0$ | $E_1$ | $E_2$ |
| $X_0$ | 1.00 | 0.80 | 0.90 |
| $X_1$ | 1.00 | 0.10 | 0.10 |
| $X_2$ | 1.00 | 0.10 | 0.50 |

406 —

| COST FUNCTION C(X,E) | | | |
|---|---|---|---|
| | $E_0$ | $E_1$ | $E_2$ |
| $X_0$ | 1.00 | 0.20 | 0.30 |
| $X_1$ | 1.00 | 0.20 | 0.30 |
| $X_2$ | 1.00 | 0.20 | 0.30 |

408 —

| INFORMATION AMOUNT I(X,E) | | | |
|---|---|---|---|
| | $E_0$ | $E_1$ | $E_2$ |
| $X_0$ | 0.07 | 0.15 | 0.15 |
| $X_1$ | 2.32 | 3.32 | 3.32 |
| $X_2$ | 2.32 | 3.32 | 3.32 |

410 —

| INFORMATION VALUE V(X,E) | | | |
|---|---|---|---|
| | $E_0$ | $E_1$ | $E_2$ |
| $X_0$ | 0.07 | 0.60 | 0.45 |
| $X_1$ | 2.32 | 1.66 | 1.11 |
| $X_2$ | 2.32 | 1.66 | 5.53 |

| INFORMATION ACQUISITION METHOD "E" | |
|---|---|
| $E_0$ | HIGH FREQUENCY |
| $E_1$ | LOW FREQUENCY |
| $E_2$ | LOW FREQUENCY WITH OWN PREDICTION DATA |

502

| | | $E_0$ | $E_1$ | $E_2$ |
|---|---|---|---|---|
| $X_0$ | NORMAL STATE | 0.05 | 0.10 | 0.10 |
| $X_1$ | ACCIDENT STATE | 0.80 | 0.90 | 0.90 |
| $X_2$ | CONGESTION STATE IN MORNING/EVENING | 0.80 | 0.90 | 0.90 |

504

| INFORMATION LOSS FUNCTION L(X,E) | | | |
|---|---|---|---|
| | $E_0$ | $E_1$ | $E_2$ |
| $X_0$ | 1.00 | 0.80 | 0.90 |
| $X_1$ | 1.00 | 0.10 | 0.10 |
| $X_2$ | 1.00 | 0.10 | 0.50 |

506

| COST FUNCTION C(X,E) | | | |
|---|---|---|---|
| | $E_0$ | $E_1$ | $E_2$ |
| $X_0$ | 1.00 | 0.20 | 0.90 |
| $X_1$ | 1.00 | 0.20 | 0.90 |
| $X_2$ | 1.00 | 0.20 | 0.90 |

508

| INFORMATION AMOUNT I(X,E) | | | |
|---|---|---|---|
| | $E_0$ | $E_1$ | $E_2$ |
| $X_0$ | 0.07 | 0.15 | 0.15 |
| $X_1$ | 2.32 | 3.32 | 3.32 |
| $X_2$ | 2.32 | 3.32 | 3.32 |

510

| INFORMATION VALUE V(X,E) | | | |
|---|---|---|---|
| | $E_0$ | $E_1$ | $E_2$ |
| $X_0$ | 0.07 | 0.60 | 0.15 |
| $X_1$ | 2.32 | 1.66 | 0.37 |
| $X_2$ | 2.32 | 1.66 | 1.84 |

GEOSPATIAL DATA ACQUISITION BASED ON INFORMATION VALUE

BACKGROUND

The present disclosure relates to data acquisition, and, more specifically, to selecting an information acquisition method for acquiring geo spatial data from Application Programming Interfaces (APIs).

Enterprises and organizations can publish data as an API through which the information can be utilized by applications. Data published as APIs can be utilized in both Business-to-Consumer (B2C) applications (e.g., directed to personal applications running on smartphones, etc.) and Business-to-Business (B2B) applications (e.g., in applications where third-party enterprises provide proprietary services by utilizing information obtained via APIs).

Procuring data from APIs generally requires a fee in order to access and use the data. The amount can vary in accordance with the number of API calls made in a unit time and/or with the size of data acquired.

SUMMARY

Aspects of the present disclosure are directed toward a computer-implemented method comprising determining a context for geospatial data to be used in an application, where the context is based on one or more external factors that influence variation of the geospatial data. The method further comprises calculating an information value of the geospatial data in the context for each of a plurality of information acquisition methods, where the plurality of information acquisition methods include respective data acquisition frequencies and respective spatial resolutions, and where the information value is based on an information loss, an information amount, and a cost. The method further comprises selecting a first information acquisition method with a highest information value, and acquiring the geospatial data using the first information acquisition method.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward data acquisition, and, more specifically, to selecting an information acquisition method for acquiring geospatial data from third-party Application Programming Interfaces (APIs). While not limited to such applications, embodiments of the present disclosure may be better understood in light of the aforementioned context.

The acquisition of data via one or more APIs for one or more applications can be referred to as the API economy insofar as third parties that acquire data can subsequently vend the data to one or more applications. One example of the API economy relates to systems that provide mobility services for connected vehicle applications (e.g. IoT Connected Vehicle Insights, a product of International Business Machines Corporation®), where the connected vehicle applications can acquire various data published by third-party enterprises (e.g., weather information, traffic volume, traffic accidents, etc.), and provide services such as the forecasting of traffic congestion, vehicle routing, and the like to vehicles, smartphones, or other devices.

Applications utilizing geospatial information can be improved by increasing time resolution (frequency) of calling external APIs and/or increasing spatial resolution (mesh resolution) of the data retrieved from the external APIs. However, increasing the number of API calls and/or the spatial resolution also increases the data size, resulting in an increase in the cost to acquire the data. Conversely, decreasing the frequency of API calls or decreasing the spatial resolution decreases the accuracy and the real-time usefulness of the applications, thereby leading to deteriorated performance of the application.

Returning again to the example of connected vehicle applications, the value of the information acquired by an API varies according to the weather conditions and/or traffic conditions at the time of calling the API. For example, data from a low-traffic time period (e.g., midnight on a weekday) during a stable weather pattern (e.g., clear skies) with typical behavior (e.g., no accidents) may have relatively less value than data from a high-traffic time period (e.g., a rush hour) with an unstable weather pattern (e.g., scattered severe thunderstorms) with atypical behavior (e.g., one or more accidents). The decrease in data value of the first example relative to the second example is due to at least two factors: (i) data in the first example can be predicted from historical data with reasonable accuracy whereas data in the second example is difficult to accurately predict from historical data; and (ii) adjacent time intervals and adjacent spatial areas in the first example are relatively similar in the first example whereas adjacent time intervals and adjacent spatial areas in the second example may be significantly dissimilar.

Accordingly, complex, variable, or unstable environments may require increased data acquisition frequency and/or spatial resolution to perform adequately, while simple, predictable, or stable environments may require relatively decreased data acquisition frequency and/or spatial resolution to perform adequately. However, in many cases, a fixed information acquisition method (including one or both of a fixed data acquisition frequency and/or a fixed spatial resolution) is used to obtain the information. This is disadvantageous insofar as a fixed information acquisition method may be unnecessarily robust for the first example (and thus, an inefficient use of resources and capital) while the same fixed information acquisition method may be insufficient for the second example (and thus, lead to a degraded quality of service).

Accordingly, aspects of the present disclosure are directed to selecting an appropriate information acquisition method based on a context of an application. For example, for an application related to retrieving weather condition information in a city for the purposes of providing vehicle routing, if the context is that the weather is good (e.g., clear skies, no precipitation, stable barometric pressure distribution, etc.), then the weather data can be retrieved with relatively less resolution (e.g., five square mile mesh) and/or relatively less frequency (e.g., every hour). In contrast, if the context is that the weather is problematic for vehicles (e.g., unstable weather conditions such as intermittent heavy rains, thunderstorms, etc.), then the weather data can be retrieved with relatively higher resolution (e.g., one square mile mesh) and/or relatively higher frequency (e.g., every ten minutes).

Aspects of the present disclosure select the appropriate information acquisition method based on a value associated with the geospatial information for each of a plurality of information acquisition methods and a given context. The information acquisition method exhibiting the highest value can then be selected, and the geospatial information can be acquired using the selected information acquisition method.

The context (e.g., referred to as "X") of the geospatial information can be defined as an external factor that influences the variation of the geospatial information. This can include, for example, location, time, day of week, month, a freshness of recently acquired data, statistical properties of historical data, a number of users of the application, and/or other relevant information.

The information acquisition method (e.g., referred to as "E") can be an information acquisition method which influences the accuracy and cost of information. This includes an API call frequency (e.g., time resolution, data acquisition frequency, etc.), mesh resolution (e.g., spatial resolution, etc.), and the type of information source (e.g., when selection is possible from numerous information sources).

The information amount (e.g., referred to as "I") can be an absolute amount of information that is collected for a given context and information acquisition method. This can be represented by Equation 1:

$$I(X,E) = -\log(1 - P(X,E)) \qquad \text{Equation 1:}$$

In Equation 1, P(X,E) can be an information variation probability for acquiring geospatial information using information acquisition method E in context X. When variation probability P is high, the information amount I is large. When variation probability P is low, the information amount I is small. The information variation probability can be based on the concept of information entropy, or simply entropy, as understood by those of skill in the art of information theory.

The information value (e.g., referred to as "V") can be based on an information acquisition cost, an information loss risk, and an information amount as shown in Equation 2:

$$V(X,E) = \frac{L(X,E) * I(X,E)}{C(X,E)} \qquad \text{Equation 2}$$

In Equation 2, L(X,E) can be an information loss function that accounts for a risk of failing to detect information variations as a result of a frequency and/or a resolution of a given information acquisition method E in context X. In some embodiments, information loss function L(X,E) can represent a decrease in the accuracy of the acquired geospatial information when acquiring the geospatial information using information acquisition method E in context X. Accordingly, information loss function L(X,E) can output a relatively lower value when the risk for information loss is relatively high and/or the accuracy degradation is relatively significant. Conversely, information loss function L(X,E) can output a relatively higher value when the risk for information loss is relatively lower and/or the accuracy degradation is relatively less significant. The cost function C(X,E) can be a function that reflects the cost of acquiring information using a given information acquisition method E in context X. Thus, as can be seen in Equation 2, the information value function V(X,E) can be directly, linearly, proportionally, or otherwise related to the information loss function L(X,E) and the information amount function I(X,E), and the information value function V(X,E) can be inversely related to the cost function C(X,E). Furthermore, Equation 2 illustrates that even in situations having a same information amount, the information value decreases when the information loss risk is high (as reflected by a low value output by the information loss function L(X,E)) and/or the cost is high.

After utilizing Equations 1 and 2 to select an information acquisition method E having a highest information value V for a given context X, aspects of the present disclosure can call an external API in order to collect the geospatial information using the selected information acquisition method E.

In some embodiments, data is received from multiple sources. For example, aspects of the present disclosure may also predict geospatial data based on historical data available to the application. In this way, aspects of the present disclosure can supplement data obtained from an external API by using predicted data generated by the application (or provided to the application from another service).

In such embodiments including predicted geospatial data, the cost of using computational resources necessary for the analysis of historical data and/or the accuracy of the predicted geospatial data are reflected in the cost function C(X,E) and/or the information loss function L(X,E). For example, when a prediction value with an accuracy equal to or higher than a threshold value can be calculated with a lower cost than using an external API, aspects of the present disclosure may rely, in whole or in part, on the predicted geospatial data rather than exclusively on geospatial data received from the external APIs.

Although geospatial data is primarily discussed herein, aspects of the present disclosure are relevant to any type of data that can be retrieved using one or more external APIs in the API economy. Furthermore, although parameters related to data acquisition frequency and/or spatial resolution are primarily discussed in characterizing various information acquisition methods, more fewer, and/or different parameters that may be relevant to similar or different types of data are within the spirit and scope of the present disclosure.

Figure 1:
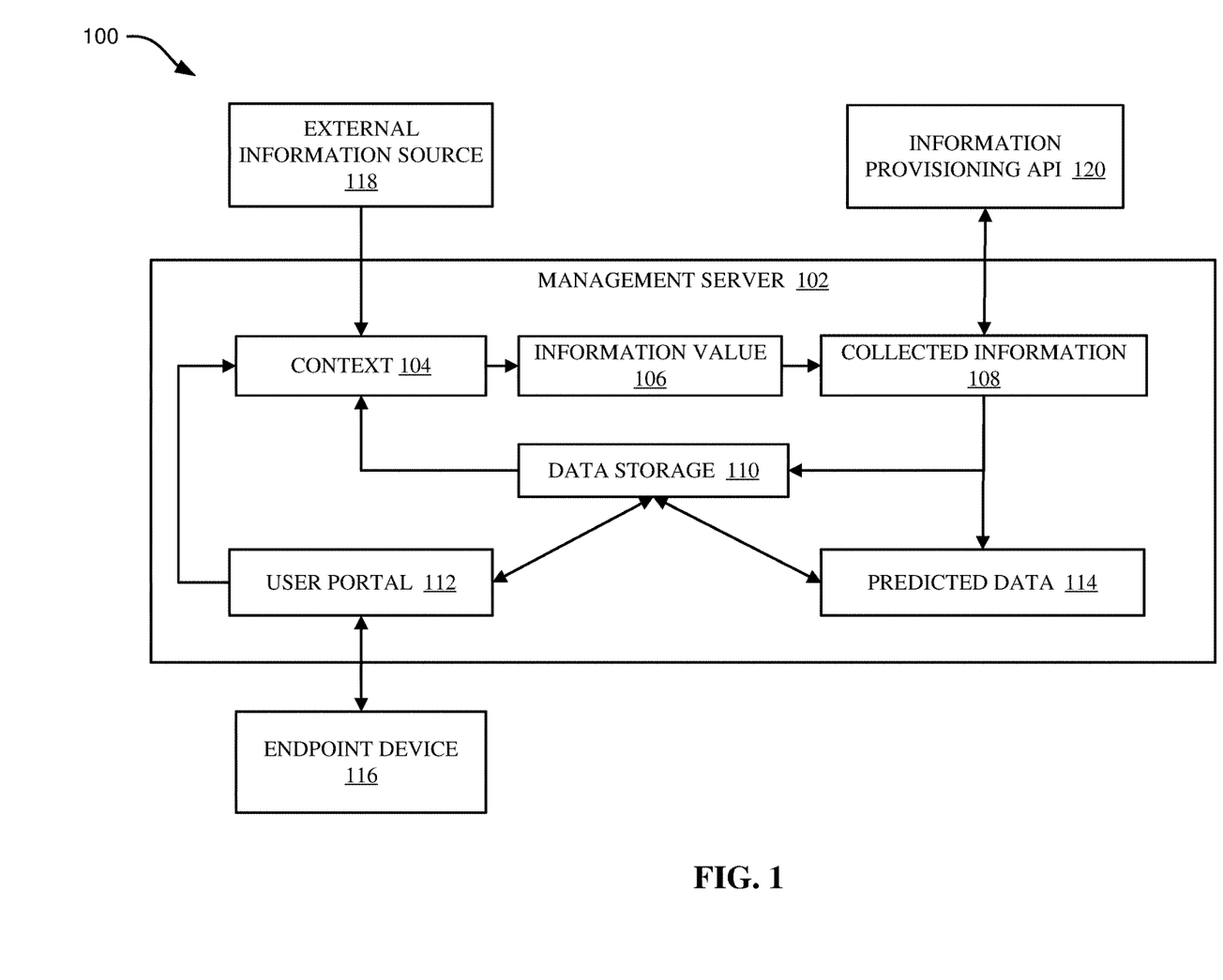
FIG. 1 illustrates a block diagram of an example computational environment, in accordance with some embodiments of the present disclosure.

Referring now to FIG. 1, illustrated is a block diagram of a computational environment 100, in accordance with some embodiments of the present disclosure. The computational environment 100 can include a management server 102 storing a context 104, an information value 106, collected information 108, a data storage 110, a user portal 112, and predicted data 114. The management server 102 can interface with external information source(s) 118, an information provisioning API 120, and/or an endpoint device 116.

The user portal 112 can function as an access point for an endpoint device 116. The endpoint device 116 can be, for example, a desktop, a laptop, a tablet, a smartphone, or another device capable of receiving input from a user and providing output to the user. The endpoint device 116 can receive a service from an application implemented, at least in part, by the management server 102, where the application utilizes data retrieved, at least in part, from an information provisioning API 120. Example applications associated with the management server 102 can be, but are not limited to, connected vehicle applications (e.g., applications related to self-driving, vehicle routing, driver support, and the like), weather applications (e.g., applications related to providing historical, current, or predicted weather reports, predicting weather phenomena, monitoring pollution, etc.), geospatial applications (e.g., applications related to routing between locations, virtually marking selected locations, etc.), agricultural applications, health and wellness applications, and so on.

The management server 102 can generate the context 104 (e.g., X) using data from data storage 110, external information source(s) 118, and/or data from endpoint device 116 via the user portal 112. The context 104 can be an external factor that influences the variation of data utilized by the management server 102, such as, for example geospatial data. For example, context 104 can be related to weather, traffic flow, health information, logistical information, agricultural information, and so on. The management server 102 can calculate an information value 106 (e.g., V) for the context 104 and a plurality of information acquisition methods E. The information value 106 can be calculated according to Equation 2. The information value 106 can be based on an information loss, an information amount, and a cost. Advantageously, the information value 106 can mathematically represent the multifaceted value proposition for each of a plurality of information acquisition methods based on respective information losses, information amounts, and costs associated with each information acquisition method for the context 104.

The management server 102 can store collected information 108 that is collected from the information provisioning API 120 and/or from predicted data 114 based on the information acquisition method E associated with a highest information value 106.

In some embodiments, the predicted data 114 can include predicted geospatial information from historical geospatial information accumulated in the data storage 110. In some embodiments, the predicted data 114 can be predicted by a model (e.g., a machine learning model, a deep learning model, etc.) trained on a historical dataset similar to the data from information provisioning API 120 and stored in the data storage 110. In some embodiments, the predicted data 114 can be used in place of, or in combination with, data received from the information provisioning API 120. In such embodiments, utilizing predicted data 114 may influence the management server 102 in one or more of the following ways: (i) decrease costs associated with acquiring data from the information provisioning API 120; (ii) increase computational costs associated with generating a model and archiving data associated with the generated model for generating predicted data 114; and/or (iii) decrease the quality of service provided to the endpoint device 116 due to potentially decreased accuracy of predicted data 114 relative to actual data provided by the information provisioning API 120. In light of these factors, predicted data 114 can be strategically used for supplementing or replacing data from the information provisioning API 120 in situations where the benefits of using the predicted data 114 outweigh the potential drawbacks of using the predicted data 114.

The management server 102 can utilize the collected information 108 to provide a service to the endpoint device 116 via the user portal 112. Although a single endpoint device 116 is shown, in some embodiments, tens, hundreds, thousands, or millions of endpoint devices 116 are provided a service by management server 102 using collected information 108.

More or fewer components than the components illustrated in FIG. 1 can be included in other embodiments of the present disclosure. Furthermore, the components illustrated, if they are present at all, can be in different configurations than the configuration shown in FIG. 1. Further still, components in FIG. 1 can be tangible computational assets, virtually provisioned computational assets, or a combination of both, according to various embodiments of the present disclosure.

Figure 2:
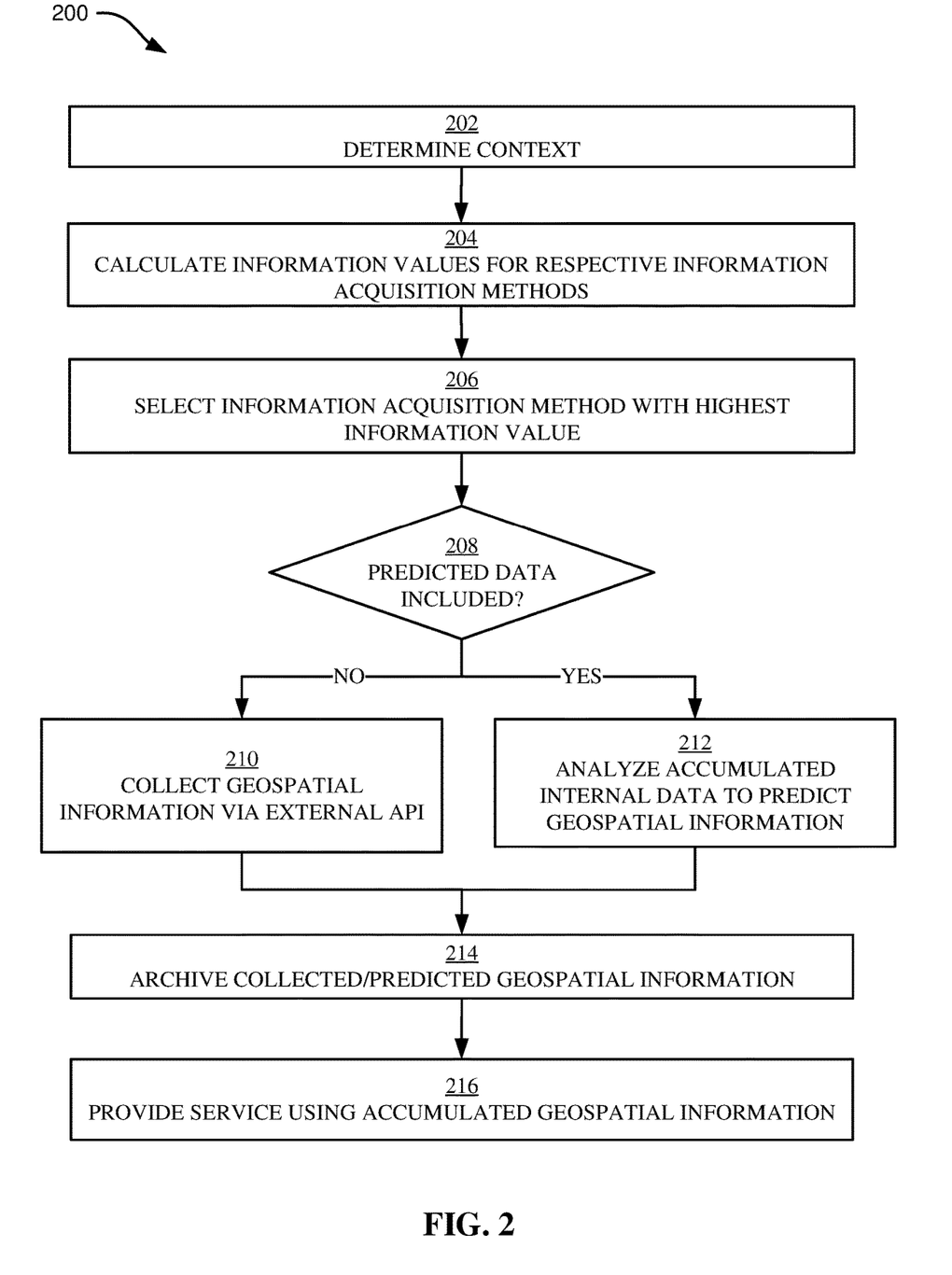
FIG. 2 illustrates a flowchart of an example method for selecting an information acquisition method based on an information value, in accordance with some embodiments of the present disclosure.

FIG. 2 illustrates a flowchart of an example method 200 for selecting an information acquisition method based on an information value, in accordance with some embodiments of the present disclosure. The method 200 can be implemented by, for example, a management server 102, a computer, a processor, or another combination of hardware and/or software.

Operation 202 includes determining a context 104 (e.g., X) for a request for data. In some embodiments, the request for data is generated within the management server 102 in order to trigger the collection of data for providing a service to one or more endpoint devices 116. In some embodiments, the request is received from an endpoint device 116 via the portal 112. In some embodiments, operation 202 includes consulting data from data storage 110 and/or data from external information source(s) 118 to determine the context 104.

Operation 204 includes calculating information values 106 (e.g., $V_1$, $V_2$, . . . , $V_n$) for respective information acquisition methods (e.g., $E_1$, $E_2$, . . . , $E_n$) of a plurality of information acquisition methods. The information values 106 can be calculated according to Equation 2. In some embodiments, information values 106 are based on an information loss, an information amount, and a cost. In some embodiments, the information amount is calculated according to Equation 1.

Operation 206 includes selecting an information acquisition method with a highest information value 106. As previously discussed, the highest information value reflects a beneficial information acquisition method having satisfactory blend of sufficiently robust data that is acquired at an acceptable cost.

Operation 208 includes determining if the selected information acquisition method includes predicted data 114. If not, (208: NO), the method 200 can proceed to operation 210 and acquire collected information 108 from the information provisioning API 120 according to the selected information acquisition method. If so, (208: YES), the method 200 can proceed to operation 212 and analyze accumulated data in the data storage 110 for the purposes of generating predicted data 114. In some embodiments, operation 212 can further comprise accessing the information provisioning API 120 to provide supplementary geospatial information to be used in conjunction with the predicted data 114.

From operations 210 and 212, the method 200 proceeds to operation 214. Operation 214 includes archiving the collected information 108 (including data acquired from the information provisioning API 120 and/or the predicted data 114) in the data storage 110. Operation 216 includes providing an application or a service using the collected information 108. In some embodiments, the application or service is provided to an endpoint device 116 via the user portal 112. In some embodiments, the application or service relates to one or more of connected vehicle applications, weather applications, geospatial applications, health applications, e-commerce applications, agricultural applications, and so on.

Figure 3:
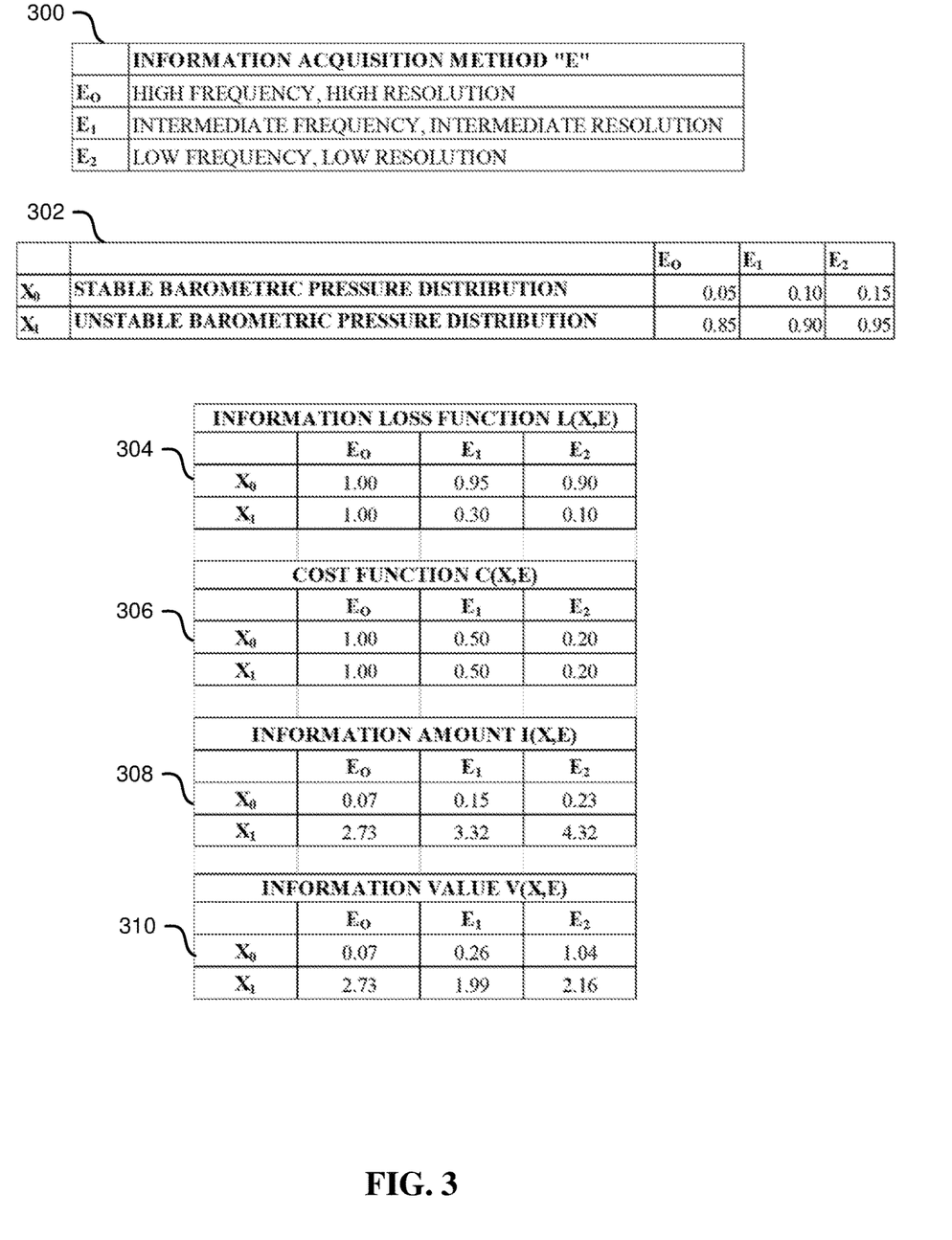
FIG. 3 illustrates an example weather-related application using geospatial data, in accordance with some embodiments of the present disclosure.

FIG. 3 illustrates an example weather information data collection application, in accordance with some embodiments of the present disclosure. In some embodiments, the tables illustrated in FIG. 3 are stored in a management server 102, a computer-readable storage medium, or another data storage device. FIG. 3 includes an information acquisition method table 300, a context and information variation probability table 302, an information loss function table 304, a cost function table 306, an information amount table 308, and an information value table 310.

The information acquisition method table 300 illustrates three information acquisition methods, $E_0$, $E_1$, and $E_2$. Information acquisition method $E_1$ is a relatively high frequency and high-resolution acquisition method. Information acquisition method $E_2$ is a relatively intermediate frequency and intermediate resolution acquisition method. Information acquisition method $E_3$ is a relatively low frequency and low-resolution acquisition method.

The context and information variation probability table 302 includes a first context, $X_0$, corresponding to a stable barometric pressure distribution (suggesting consistent, predictable, and/or stable weather patterns) and a second context, $X_1$, corresponding to an unstable barometric pressure distribution (suggesting erratic, unpredictable, and/or unstable weather patterns). The cell values corresponding to different combinations of context X and information acquisition method E reflect various information variation probabilities (e.g., P(X,E)).

For the first context, $X_0$, corresponding to the stable barometric pressure distribution, the influence of the spatial resolution and/or the time resolution to the information variation probability is small, and thus, the amount of information is relatively small. This is reflected in the values of 0.05, 0.10, and 0.15 for the information acquisition methods $E_0$, $E_1$, and $E_2$, respectively. Conversely, for the second context, $X_1$, corresponding to an unstable barometric pressure distribution, the influence of the spatial resolution and/or the time resolution to the information variation probability is relatively larger, and, thus, the amount of information is also generally larger. This is reflected in the values of 0.85, 0.90, and 0.95 for the information acquisition methods $E_0$, $E_1$, and $E_2$, respectively.

The information loss function table 304 illustrates that for the first context, $X_0$, the information loss across the three information acquisition methods $E_0$, $E_1$, and $E_2$ is relatively stable. Conversely, for the second context, $X_1$, the information loss from information acquisition methods $E_1$ and $E_2$ is substantially larger (as reflected by a substantially smaller number) compared to $E_0$. This is due to an unstable barometric pressure distribution causing erratic and localized weather patterns. Accordingly, relatively lower frequency and/or resolution result in relatively higher information loss (as indicated by lower cell values).

The cost function table 306 illustrates that the cost for the three information acquisition methods $E_0$, $E_1$, and $E_2$ decreases as a function of decreasing frequency and/or resolution. Furthermore, the costs of the various information acquisition methods are not influenced by the contexts insofar as the contexts do not alter the costs associated with the various information acquisition methods $E_0$, $E_1$, and $E_2$.

The information amount table 308 includes information amounts calculated according to Equation 1. As previously discussed, the information amount is based on the information variation probability (as shown in context and information variation probability table 302). More specifically, when the variation probability is relatively larger, the information amount is also relatively larger, and vice versa. This characterization can be referred to as information entropy, or simply entropy, in information theory. Accordingly, the information amount table 308 includes values following a similar trend as the context and information variation probability table 302.

The information value table 310 can include values calculated according to Equation 2 and based on the information in the aforementioned tables. The information value table 310 can mathematically represent the multifaceted value proposition for each combination of context X and information acquisition method E based on respective information losses, information amounts, and costs associated with each combination of context X and information acquisition method E. Accordingly, relatively higher numbers in information value table 310 demonstrate relatively more beneficial, preferred, or optimal information acquisition methods E for respective contexts X while relatively lower numbers in the information value table 310 represent relatively less beneficial, less preferred, or sub-optimal information acquisition methods E for respective contexts X.

Regarding the first context, $X_0$, the third information acquisition method $E_2$ demonstrates a highest information value. This is because the third information acquisition method $E_2$ exhibits an acceptably low risk of information loss (per information loss function table 304) together with a relatively high information amount (per information amount table 308) and a relatively low cost (per cost function table 306). Referring back to Equation 2, where the information loss function and the information amount are in the numerator and cost is in the denominator, it can be seen that the combination of values provided by the third information acquisition method $E_2$ with respect to the first context $X_0$ provides an advantageous information value. Therefore, information acquisition method $E_2$ is the most efficient relative to information acquisition methods $E_0$ and $E_1$.

Regarding the second context $X_1$, the first information acquisition method $E_1$ demonstrates a highest information value insofar as decreasing the frequency and/or the resolution decreases the cost but increases the risk of information loss. In this case, information acquisition method $E_0$ is most beneficial for the context $X_1$.

While FIG. 3 illustrates three information acquisition methods and two contexts, this is for illustrative purposes only. In other embodiments, there can be tens, hundreds, or thousands of information acquisition methods and tens, hundreds, or thousands of contexts. In some embodiments, the management server 102 determines a context 104, consults a stored information value table 310, and selects the information acquisition method having the highest information value 106 for the context 104 according to the information value table 310.

Figure 4:
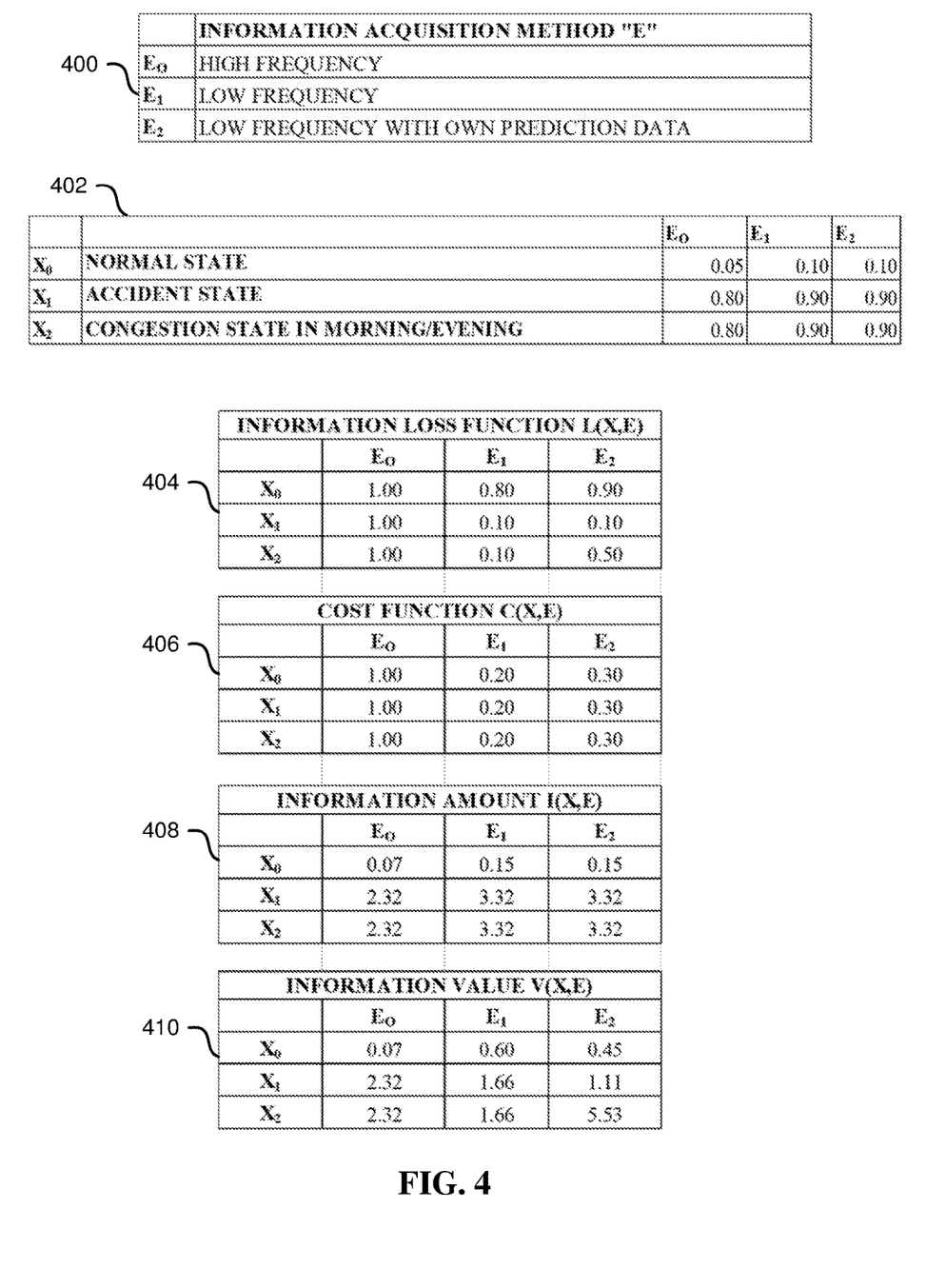
FIG. 4 illustrates an example traffic-related application using geospatial data, in accordance with some embodiments of the present disclosure.

FIG. 4 illustrates an example traffic flow data collection application, in accordance with some embodiments of the present disclosure. In some embodiments, the tables illustrated in FIG. 4 are stored in a management server 102, a computer-readable storage medium, or another data storage device. FIG. 4 includes an information acquisition method table 400, a context and information variation probability table 402, an information loss function table 404, a cost function table 406, an information amount table 408, and an information value table 410.

The information acquisition method table 400 includes three information acquisition methods $E_0$, $E_1$, and $E_2$ corresponding to high frequency, low frequency, and low frequency with predicted data, respectively. The context and information variation probability table 402 includes the information variation probability for respective combinations of the three information acquisition methods with the three contexts $X_0$, $X_1$, and $X_2$. The three contexts $X_0$, $X_1$, and $X_2$ correspond to a normal state, an accident state, and a congestion state during a morning/evening commute, respectively.

The information loss table 404 illustrates the information losses associated with various combinations of information acquisition method E and context X. Likewise, the cost function table 406 illustrates costs for various combinations of information acquisition method E and context X. Likewise, the information amount table 408 illustrates information amounts for various combinations of information acquisition method E and context X. Finally, the information value table 410 illustrates values for various combinations of information acquisition method E and context X. As can be seen in the information value table 410, the for the first context, $X_0$, the information acquisition method $E_1$ is most beneficial. For the second context, $X_1$, the information acquisition method $E_0$ is most beneficial. For the third context, $X_2$, the information acquisition method $E_2$ is most beneficial.

Several observations regarding FIG. 4 can be made. First, it is relatively straightforward to predict traffic flow from historical data for repetitive and/or recurring traffic events (e.g., traffic congestion during morning and/or evening commuting hours). However, it is far more difficult to accurately predict traffic flow in the case of traffic disruptions due to non-recurrent congestion (e.g., an accident). This is reflected in the information loss function table 404 where $E_1$ and $E_2$ demonstrate similar values for context $X_1$ (suggesting that the predicted data provided a negligible contribution to information loss). In contrast, $E_2$ outperformed $E_1$ in context $X_2$ (reflecting the value provided by the predicted data for recurrent traffic events).

Another observation is that in context $X_0$ (normal state) the information variation probability is low and thus information acquisition method $E_1$, which is to be performed with low frequency, is sufficient. However, in the case of context $X_1$ (accident state) the influence of the accident to the traffic flow is large and thus information acquisition method $E_0$ (high frequency) may be desirable in order to capture the unpredictable and rapidly changing traffic flow environment caused by an accident.

In the case of context $X_2$ (congestion state) in which recurring congestion is occurring with no accident, information acquisition method $E_1$ (low frequency) may suffer from a relatively larger risk of information loss, but it may be supplemented with predicted data to efficiently acquire traffic flow information with low cost (information acquisition method $E_2$).

While FIG. 4 illustrates three information acquisition methods and three contexts, this is for illustrative purposes only. In other embodiments, there can be tens, hundreds, or thousands of information acquisition methods and tens, hundreds, or thousands of contexts. In some embodiments, the management server 102 determines a context 104, consults a stored information value table 410, and selects the information acquisition method having the highest information value 106 for the context 104 according to the information value table 410.

Figure 5:
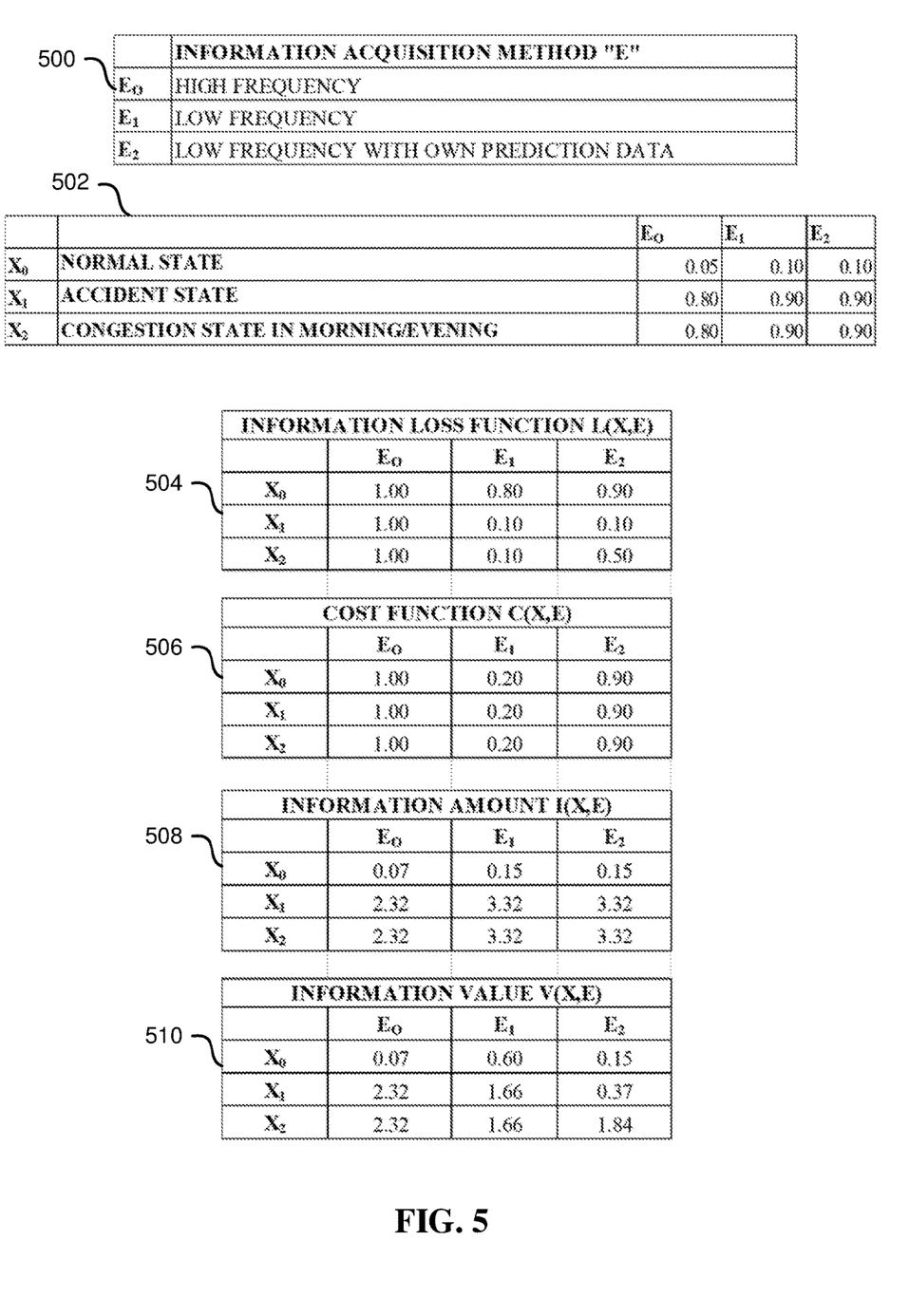
FIG. 5 illustrates the influence of varying the cost associated with generating the predicted data for the above traffic flow application, in accordance with some embodiments of the present disclosure.

FIG. 5 illustrates the influence of varying the cost associated with generating the predicted data for the above traffic flow application, in accordance with some embodiments of the present disclosure. In some embodiments, the tables illustrated in FIG. 5 are stored in a management server 102, a computer-readable storage medium, or another data storage device. FIG. 5 includes an information acquisition method table 500, a context and information variation probability table 502, an information loss function table 504, a cost function table 506, an information amount table 508, and an information value table 510.

The tables in FIG. 5 are generally consistent with the tables in FIG. 4 except for the change in cost of information acquisition method $E_2$ as shown in the cost function table 506 and its corresponding influence on the values for information acquisition method $E_2$ in the information value table 510. As shown in the cost function table 506, the cost for information acquisition method $E_2$ is 0.90, or approximately three times the cost as previously discussed with respect to the cost function table 406 of FIG. 4. This change illustrates the influence of costs associated with generating predicted data on the final information value for information acquisition methods supplemented with predicted data. Given this change in cost for the information acquisition method $E_2$, this method no longer exhibits a highest information value for any context X as shown in information value table 510. In contrast, in the information value table 410 of FIG. 4, the information acquisition method $E_2$ was the largest value for context $X_2$. Accordingly, FIG. 5 illustrates the influence of data prediction costs on final information values. Data prediction costs can be influenced by numerous factors including, for example, available computational resources, rates/usage fees for using the computational resources, time-based discounts/surcharges for using the computational resources, rates/usage fees for storage resources capable of archiving data for future analysis and/or training, robustness of data in data storage 110 used to generate the predicted data 114, complexity of the application, a type of model used to make the predictions, an amount of time required to create a model, and so on. Thus, FIG. 5 illustrates that when the cost of generating predicted data is high, it may be preferable rely exclusively on data provided by an external API (e.g., information provisioning API 120).

Figure 6:
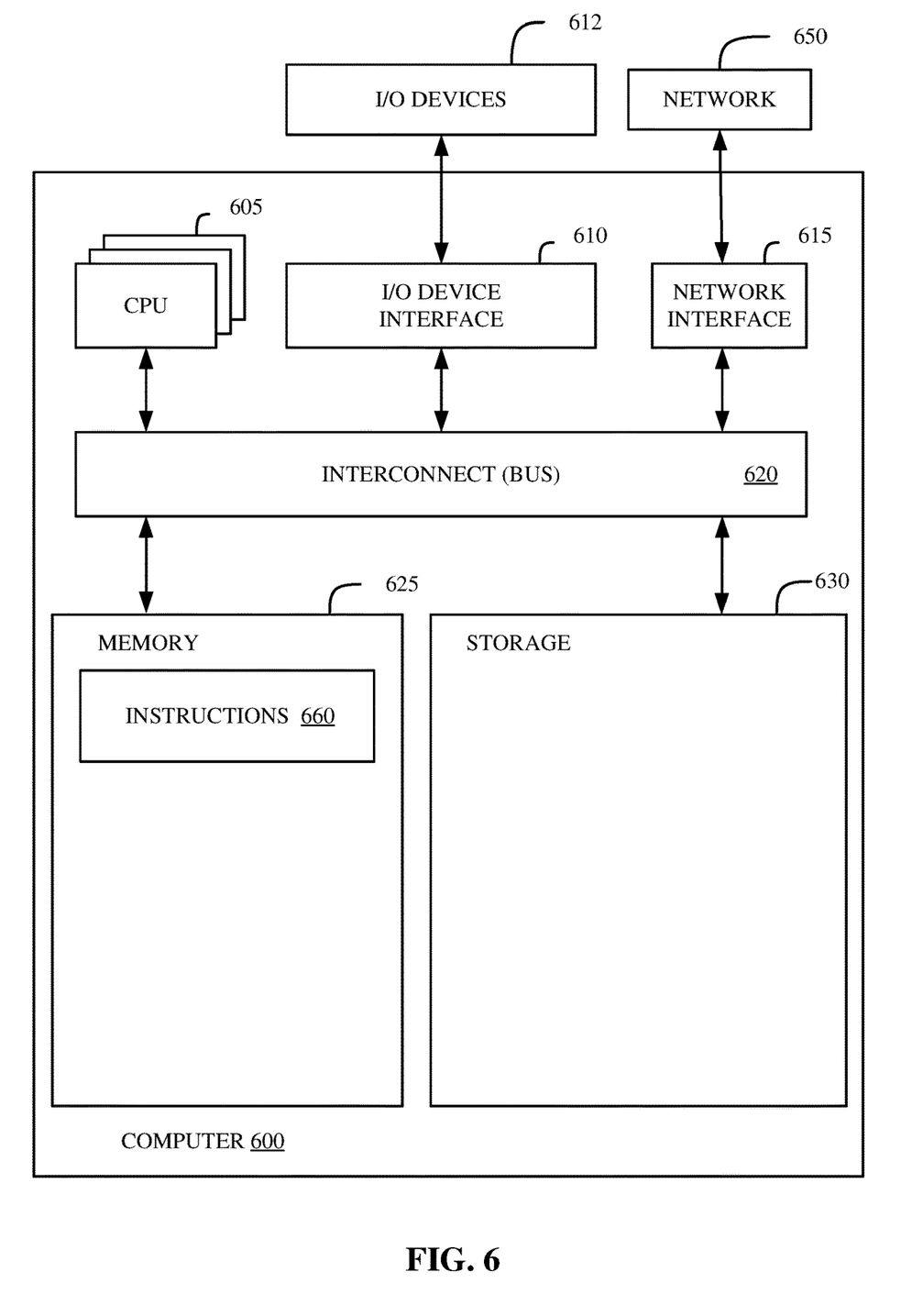
FIG. 6 illustrates a block diagram of an example computer, in accordance with some embodiments of the present disclosure.

FIG. 6 illustrates a block diagram of an example computer 600 in accordance with some embodiments of the present disclosure. In various embodiments, computer 600 can perform any or all of the methods described in FIG. 2 and/or implement the functionality discussed in any one of FIGS. 1 and/or 3-5. In some embodiments, computer 600 receives instructions related to the aforementioned methods and functionalities by downloading processor-executable instructions from a remote data processing system via network 650. In other embodiments, computer 600 provides instructions for the aforementioned methods and/or functionalities to a client machine such that the client machine executes the method, or a portion of the method, based on the instructions provided by computer 600. In some embodiments, the computer 600 is incorporated into (or functionality similar to computer 600 is virtually provisioned to) the management server 102 of FIG. 1, other aspects of the computational environment 100 of FIG. 1, or another aspect of the present disclosure.

Computer 600 includes memory 625, storage 630, interconnect 620 (e.g., BUS), one or more CPUs 605 (also referred to as processors herein), I/O device interface 610, I/O devices 612, and network interface 615.

Each CPU 605 retrieves and executes programming instructions stored in memory 625 or storage 630. Interconnect 620 is used to move data, such as programming instructions, between the CPUs 605, I/O device interface 610, storage 630, network interface 615, and memory 625. Interconnect 620 can be implemented using one or more busses. CPUs 605 can be a single CPU, multiple CPUs, or a single CPU having multiple processing cores in various embodiments. In some embodiments, CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random-access memory (e.g., static random-access memory (SRAM), dynamic random access memory (DRAM), or Flash). Storage 630 is generally included to be representative of a non-volatile memory, such as a hard disk drive, solid state device (SSD), removable memory cards, optical storage, or flash memory devices. In an alternative embodiment, storage 630 can be replaced by storage area-network (SAN) devices, the cloud, or other devices connected to computer 600 via I/O device interface 610 or network 650 via network interface 615.

In some embodiments, memory 625 stores instructions 660. However, in various embodiments, instructions 660 are stored partially in memory 625 and partially in storage 630, or they are stored entirely in memory 625 or entirely in storage 630, or they are accessed over network 650 via network interface 615.

Instructions 660 can be computer-readable and computer-executable instructions for performing any portion of, or all of, the methods of FIG. 2 and/or implementing the functionality discussed in FIGS. 1 and/or 3-5. In some embodiments, instructions 660 can be referred to as a data acquisition protocol, data acquisition instructions, and/or a data acquisition mechanism. Although instructions 660 are shown in memory 625, instructions 660 can include program instructions collectively stored across numerous computer-readable storage media and executable by one or more CPUs 605.

In various embodiments, I/O devices 612 include an interface capable of presenting information and receiving input. For example, I/O devices 612 can present information to a user interacting with computer 600 and receive input from the user.

Computer 600 is connected to network 650 via network interface 615. Network 650 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
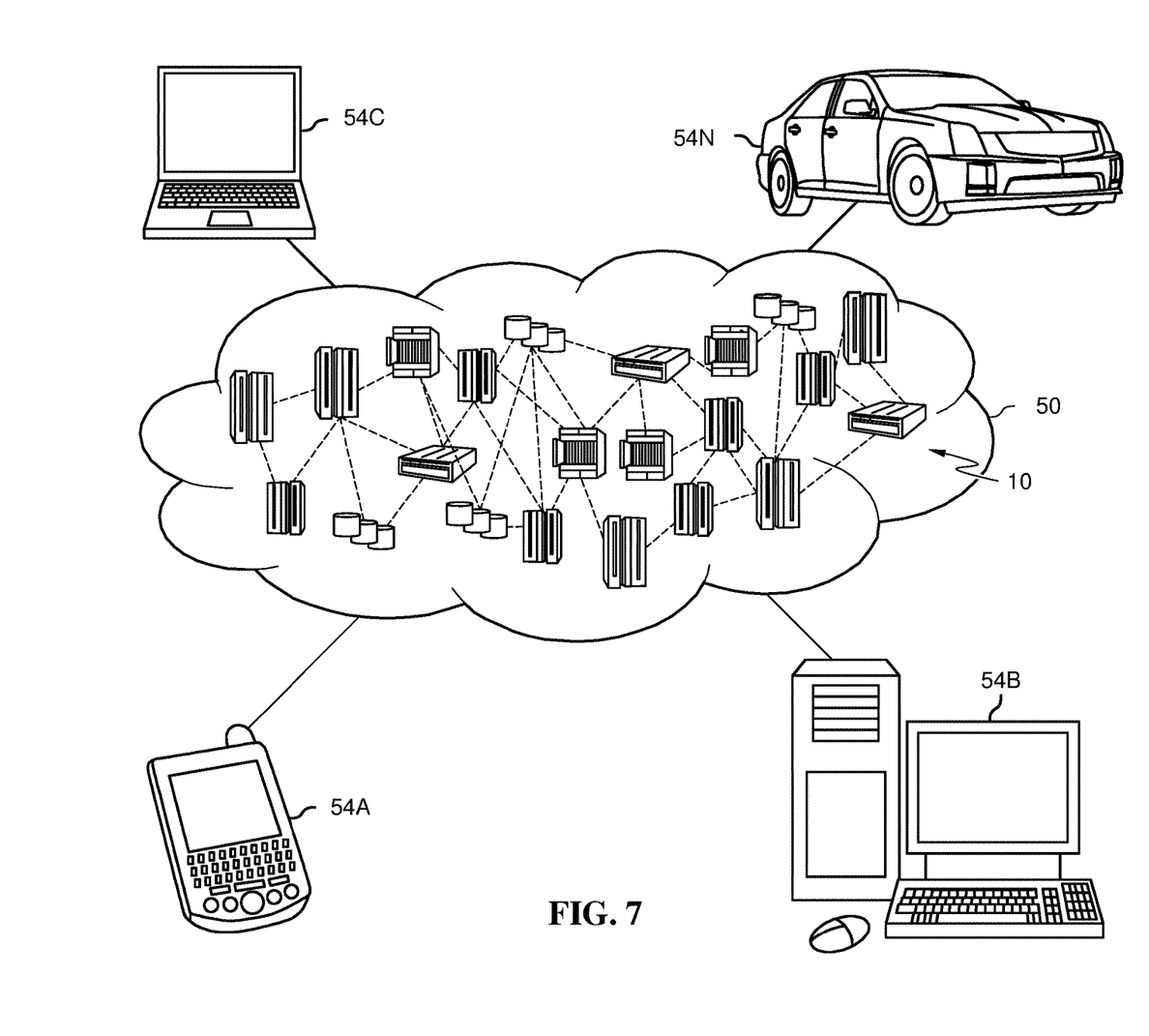
FIG. 7 depicts a cloud computing environment, in accordance with some embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
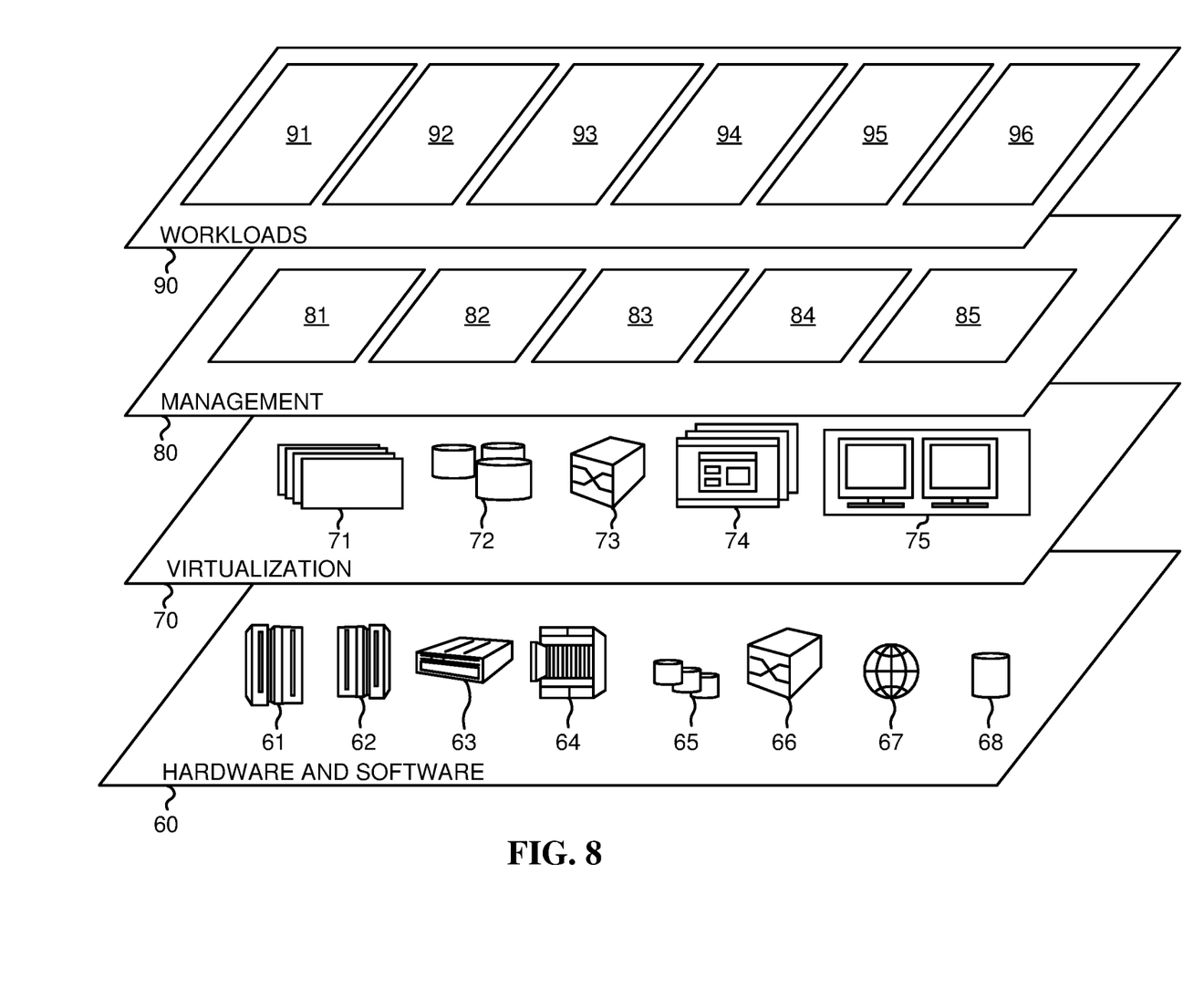
FIG. 8 depicts abstraction model layers, in accordance with some embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data acquisition 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any portion of the method described with respect to FIG. 2 and/or implement any portion of the functionality discussed in FIGS. 1 and/or 3-5) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes determining a context for geospatial data to be used in an application, wherein the context is based on one or more external factors that influence variation of the geospatial data; calculating an information value of the geospatial data in the context for each of a plurality of information acquisition methods, wherein the plurality of information acquisition methods include respective data acquisition frequencies and respective spatial resolutions, wherein the information value is based on an information loss, an information amount, and a cost; selecting a first information acquisition method with a highest information value; and acquiring the geospatial data using the first information acquisition method.

Example 2 includes the method of example 1, including or excluding optional features. In this example, the information amount is based on an information variation probability of each of the plurality of information acquisition methods. Optionally, the information variation probability is based on information entropy.

Example 3 includes the method of any one of examples 1 to 2, including or excluding optional features. In this example, the information loss indicates a risk of failing to detect information variations as a result of the respective data acquisition frequencies and the respective spatial resolutions.

Example 4 includes the method of any one of examples 1 to 3, including or excluding optional features. In this example, the information loss indicates variations in accuracy of acquired information based on the data acquisition frequencies and spatial resolutions.

Example 5 includes the method of any one of examples 1 to 4, including or excluding optional features. In this example, the first information acquisition method includes a first data acquisition frequency and a first spatial resolution for acquiring the geospatial data from an information provisioning Application Programming Interface (API). Optionally, the first information acquisition method further includes supplementing the geospatial data from the information provisioning API with predicted geospatial data. Optionally, the predicted geospatial data is predicted using a machine learning model trained on a historical dataset of the geospatial data.

Example 6 includes the method of any one of examples 1 to 5, including or excluding optional features. In this example, the method is performed by a server according to software that is downloaded to the server from a remote data processing system. Optionally, the method further comprises: metering a usage of the software; and generating an invoice based on metering the usage.

Example 7 is a system. The system includes one or more processors; and one or more computer-readable storage media storing program instructions which, when executed by the one or more processors, are configured to cause the one or more processors to perform a method consistent with any one of Examples 1 to 6

Example 8 is a computer program product. The computer program product includes one or more computer readable storage media, and program instructions collectively stored on the one or more computer readable storage media, the program instructions including instructions configured to cause one or more processors to perform a method according to any one of Examples 1 to 6.

What is claimed is:

1. A computer-implemented method comprising:
   determining a context for geospatial data to be used in an application, wherein the context is based on one or more external factors that influence variation of the geospatial data;
   calculating an information value of the geospatial data in the context for each of a plurality of information acquisition methods, wherein the plurality of information acquisition methods include respective data acquisition frequencies and respective spatial resolutions, wherein the information value is based on an information loss, an information amount, and a cost;
   selecting a first information acquisition method with a highest information value; and
   acquiring the geospatial data using the first information acquisition method.

2. The computer-implemented method of claim 1, wherein the information amount is based on an information variation probability of each of the plurality of information acquisition methods.

3. The computer-implemented method of claim 2, wherein the information variation probability is based on information entropy.

4. The computer-implemented method of claim 1, wherein the information loss indicates a risk of failing to detect information variations as a result of the respective data acquisition frequencies and the respective spatial resolutions.

5. The computer-implemented method of claim 1, wherein the information loss indicates variations in accuracy of acquired information based on the data acquisition frequencies and spatial resolutions.

6. The computer-implemented method of claim 1, wherein the first information acquisition method includes a first data acquisition frequency and a first spatial resolution for acquiring the geospatial data from an information provisioning Application Programming Interface (API).

7. The computer-implemented method of claim 6, wherein the first information acquisition method further includes supplementing the geospatial data from the information provisioning API with predicted geospatial data.

8. The computer-implemented method of claim 7, wherein the predicted geospatial data is predicted using a machine learning model trained on a historical dataset of the geospatial data.

9. The computer-implemented method of claim 1, wherein the method is performed by a server according to software that is downloaded to the server from a remote data processing system.

10. The computer-implemented method of claim 9, wherein the method further comprises:
    metering a usage of the software; and
    generating an invoice based on metering the usage.

11. A system comprising:
    one or more processors; and
    one or more computer-readable storage media storing program instructions which, when executed by the one or more processors, are configured to cause the one or more processors to perform a method comprising:
    determining a context for geospatial data to be used in an application, wherein the context is based on one or more external factors that influence variation of the geospatial data;
    calculating an information value of the geospatial data in the context for each of a plurality of information acquisition methods, wherein the plurality of information acquisition methods include respective data acquisition frequencies and respective spatial resolutions, wherein the information value is based on an information loss, an information amount, and a cost;
    selecting a first information acquisition method with a highest information value; and
    acquiring the geospatial data using the first information acquisition method.

12. The system of claim 11, wherein the information amount is based on an information variation probability of each of the plurality of information acquisition methods.

13. The system of claim 11, wherein the information loss indicates a risk of failing to detect information variations as a result of the respective data acquisition frequencies and the respective spatial resolutions.

14. The system of claim 11, wherein the information loss indicates variations in accuracy of acquired information based on the data acquisition frequencies and spatial resolutions.

15. The system of claim 11, wherein the first information acquisition method includes a first data acquisition frequency and a first spatial resolution for collecting the geospatial data from an information provisioning Application Programming Interface (API), and wherein the first information acquisition method further includes supplementing the geospatial data from the information provisioning API with predicted geospatial data.

16. A computer program product comprising one or more computer readable storage media, and program instructions collectively stored on the one or more computer readable storage media, the program instructions comprising instructions configured to cause one or more processors to perform a method comprising:
    determining a context for geospatial data to be used in an application, wherein the context is based on one or more external factors that influence variation of the geospatial data;
    calculating an information value of the geospatial data in the context for each of a plurality of information acquisition methods, wherein the plurality of information acquisition methods include respective data acquisition frequencies and respective spatial resolutions, wherein the information value is based on an information loss, an information amount, and a cost;
    selecting a first information acquisition method with a highest information value; and
    acquiring the geospatial data using the first information acquisition method.

17. The computer program product of claim 16, wherein the information amount is based on an information variation probability of each of the plurality of information acquisition methods.

18. The computer program product of claim 16, wherein the information loss indicates a risk of failing to detect information variations as a result of the respective data acquisition frequencies and the respective spatial resolutions.

19. The computer program product of claim 16, wherein the information loss indicates variations in accuracy of acquired information based on the data acquisition frequencies and spatial resolutions.

20. The computer program product of claim 16, wherein the first information acquisition method includes a first data acquisition frequency and a first spatial resolution for collecting the geospatial data from an information provisioning Application Programming Interface (API), and wherein the first information acquisition method further includes supplementing the geospatial data from the information provisioning API with predicted geospatial data.

* * * * *